Sept. 27, 1966 R. E. ARSENEAU 3,275,850
TIMER
Filed Feb. 11, 1964
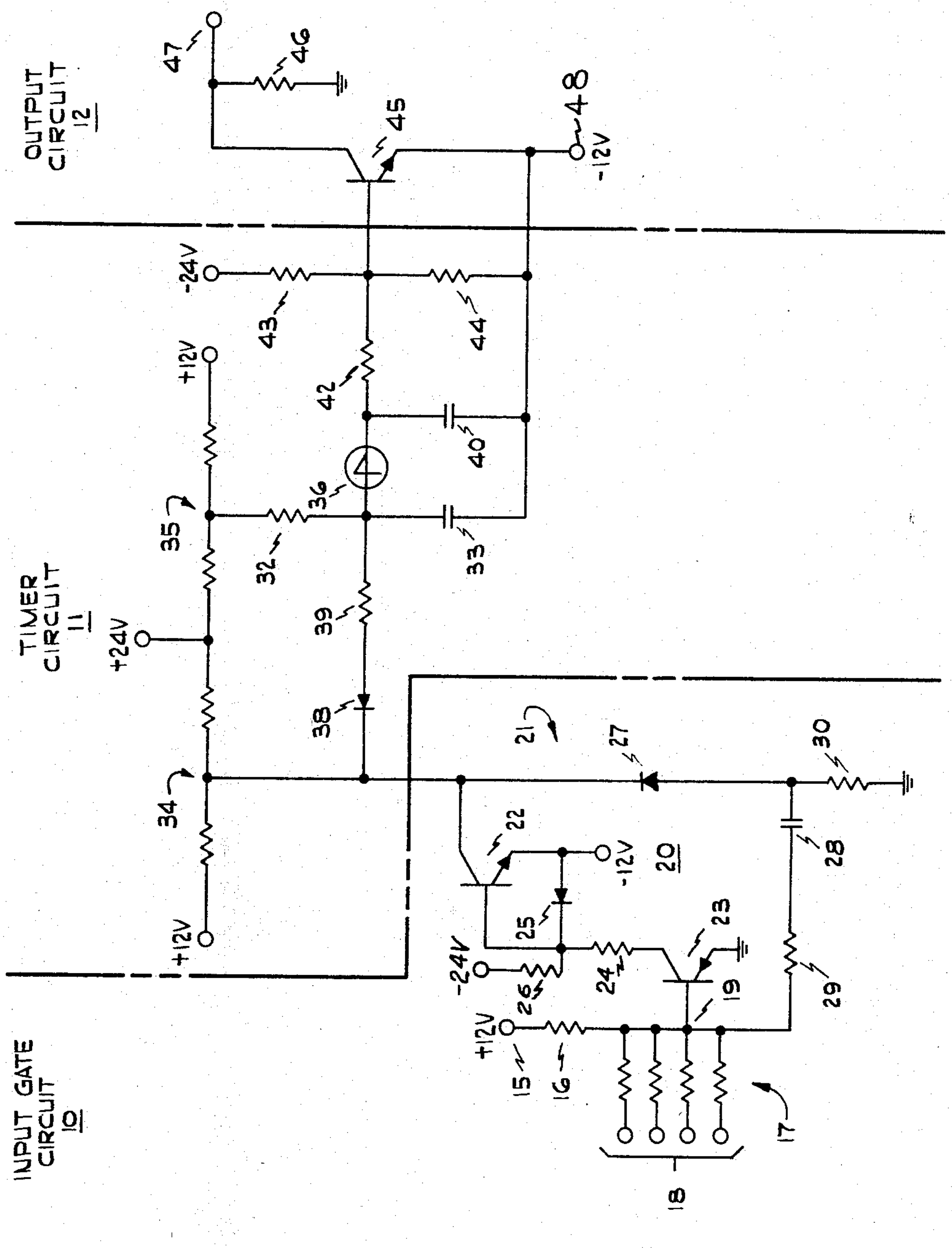
INVENTOR.
ROGER E. ARSENEAU
BY [signature]
ATTORNEY 3,275,850
Patented Sept. 27, 1966

3,275,850

TIMER

Roger Edward Arseneau, Elkgrove Village, Ill., assignor to International Telephone and Telegraph Corporation, New York, N.Y., a corporation of Maryland Filed Feb. 11, 1964, Ser. No. 344,113
8 Claims. (Cl. 307—88.5)

This invention relates to electronic timer circuits and more particularly to circuits for measuring extremely long—relative to electronic speed operations—periods of time.

Timer circuits find wide usage in electronic circuits, such as logic and data processing circuitry. In general, these timer circuits operate to transmit a signal after a predetermined period of time following an occurrence of an input signal. Broadly, this type of operation encompasses timers which provide output signals beginning with the input signal and continuing steadily until the end of a measured time period when the output signal terminates, output signals which disappear with the input signal and do not reappear until the end of the time period, and very short output signal pulses which are released only after the end of the time period. Succeeding circuits then use these or other output signals to provide or control desired logic functions after termination of the time period.

While any of many different devices may be used to measure the predetermined period of time, an RC network is most commonly used. No great problems result from this usage of RC networks if the measured period of time is short enough. However, as the time period becomes longer, the capacitor becomes larger or the charging current becomes smaller. This means that the capacitor charges over a longer period of time. Thus, the charge built upon the capacitor takes on a slower rise time, and circuits which must discriminate between one level of charge and another level of charge tend to become critical. More important, the longer the capacitor must charge, the more likely it is that the charge will simultaneously leak off of the capacitor. This leakage is hard to control, and the duration of the measured time period begins to vary widely with variations in ambient and other changeable conditions.

Accordingly, an object of the invention is to provide new and improved timer circuits. More particularly, an object is to provide timers for measuring extremely long periods of time. In this connection, an object is to provide accurately timed intervals which do not vary with changes in the ambient condition. Another object is to utilize low cost RC timing circuits without introducing marginal performance characteristics.

In accordance with one aspect of this invention, a timer circuit comprises an RC network having one side connected to a low leakage diode and the other side connected to an electronic switch. Normally, the switch is "off," and the capacitor is discharged by an input signal potential applied through the diode. When the input signal disappears, the capacitor begins to charge. While it is charging, the diode prevents the charge from leaking off of the capacitor, and the open switch prevents the capacitor from discharging into its output circuit. As the voltage charge builds upon the capacitor of the RC network, a time comes when the switch breaks down and causes the capacitor to discharge into the output circuit and send an output pulse. This way the capacitor may be made larger without giving the output pulse a slow rising wave form characteristic.

The above mentioned and other features of this invention and the manner of obtaining them will become more apparent, and the invention itself will be best understood by reference to the following description of an embodiment of the invention taken in conjunction with the accompanying drawing, in which:

The single figure is a schematic circuit diagram showing a preferred embodiment of the invention.

Broadly, the figure may be divided into three parts: an input or gate circuit 10, a timer circuit 11, and an output circuit 12. The input gate 10 receives signals marking the beginning of an event to be timed. The timer circuit 11 measures a predetermined time period following the beginning of the event after which a pulse is to be released. The output circuit 12 releases the pulse to succeeding circuits.

The input gate 10 may be adapted to respond to any desired logic function. In greater detail, a source of positive potential 15 is coupled to one end of a voltage dividing, resistor network 16, 17, and a control circuit (not shown) is connected to input terminals 18 at the other end of this network. This control circuit applies input signal potentials to the terminals 18 to establish the potential appearing at a control point 19 in the voltage dividing network 16, 17. If the preceding circuit applies negative input potentials to terminals 18, the gate 10 may be viewed as an OR gate because a signal at any terminal causes point 19 to become negative. If the preceding circuit applies a high positive potential at any of the terminals 18, gate 10 becomes an inhibit gate. In like manner, the preceding circuit may apply any of a number of potentials to input terminals 18 to provide these or other logic functions. As shown, the gate 10 is primarily intended to be used as an OR circuit.

The remainder of the input gate circuit 10 comprises a bistable trigger circuit 20 (here shown as a flip-flip circuit) and a feed-back circuit 21. The flip-flip circuit 20 comprises an NPN and a PNP transistor 22, 23 (respectively), a coupling resistor 24, and an excessive voltage protection diode 25. The potentials appearing at point 19 are applied to the base of the transistor 23 to control the flip-flip action. The bias and other connections are such that both of the transistors 22, 23 normally conduct in cascade with the coupling resistor 24 completing the circuit from the collector of transistor 23 to the base of transistor 22. The diode 25 limits the maximum potential difference across the base-emitter junction of transistor 22 to the voltage drop across the diode in the "off" condition. The resistor 26 provides an "off" bias for the transistor 22.

The feed-back circuit 21 extends from the collector of transistor 22 to the base of transistor 23 and includes a series circuit comprised (in the order named) of an isolating diode 27, a capacitor 28, and a feed-back input resistor 29. The diode 27 prevents any positive voltage on the collector of transistor 22 from entering the feed-back circuit. The capacitor 28 is a coupling device, and the resistor 29 provides an input signal to the base of the transistor 23. The resistor 30 discharges the capacitor 28 when transistor 22 switches off.

The timer circuit 11 comprises an RC network 32, 33 for measuring an extended period of time, a pair of voltage dividers 34, 35 for supplying bias voltages, and a normally open electronic switch 36. The output from the gate circuit 10 is applied to the input of the timer circuit 11 via the series circuit of an isolating diode 38 and a current limiting resistor 39 connected from the collector of transistor 22 to the electronic switch 36.

To isolate the capacitor 33 from the input circuit, the diode 38 is preferably a silicon device having an extremely low leakage characteristic. This diode is poled to allow the negative input signal to reach and discharge capacitor 33, but to prevent the capacitor 33 from receiving a charge from the voltage divider 34 which supplies collector voltage to the transistor 22. This diode, therefore, both discharges the capacitor and prevents the charge from leaking off.

The electronic switch 36 is here shown at a PNPN diode having one side connected to the junction of resistor 32 and capacitor 33 and the other side connected to the output circuit 12. Normally, the PNPN diode 36 is "off" to prevent the capacitor from discharging into its output circuit. However, switch 36 is adapted to break down when the voltage of the charge accumulating on the capacitor 33 reaches a threshold value. A PNPN diode generally turns "on" with a surge of current; therefore, its output side is coupled to a capacitor 40 for soaking up the surge.

The resistor 42 limits current to the output circuit. The resistors 43, 44 form a voltage divider for biasing both the PNPN diode 36 and a transistor 45 in the output stage.

The transistor 45 is an NPN transistor operating in a common emitter configuration. The biasing potentials are such that the transistor is normally switched "off," but will switch "on" when the PNPN diode 36 switches "on." The resistor 46 is a collector load for the transistor 45. At the terminal 47, output signals are taken from the collector of transistor 45.

The circuit operates this way. During quiescence, the preceding circuit (not shown) applies a negative voltage to one or more of the input terminals 18. The transistor 45 is "off," and terminal 47 stands at the ground potential applied through resistor 46. The negative voltage at terminals 18 holds the transistor 23 in an "on" condition, and it in turn holds the transistor 22 "on."

Since the transistor 22 is "on," its (—)12 v. emitter bias potential is fed from its collector through the diodes 27, 38. The negative voltage applied through diode 27 charges the capacitor 28 and holds the transistor 23 "on." The negative (—)12 v. potential discharges capacitor 33 since it is applied over the circuit extending through the diode 38, resistor 39, and capacitor 33 to a (—)12 v. source at 48.

When the negative voltage is removed from each of the input terminals 18, and after capacitor 28 discharges, the source 15 makes the base of transistor 23 positive relative to its emitter. The transistor 23 then turns "off" and terminates the current driving the transistor 22 which also turns "off." When transistor 22 turns "off," its (—)12 v. emitter bias potential is removed from the upper side of capacitor 33.

Means are provided for measuring a relatively long period of time after the occurrence of an event beginning with the disappearance of the negative potentials at terminal 18. In greater detail, after the transistor 22 turns "off" and the (—)12 volts are removed from the capacitor 33, it begins to charge over a circuit traced from the voltage divider 35 through resistor 32, and capacitor 33 to the (—)12 v. at source 48. The diode 38 is back biased by the potential on the voltage divider 34, and the charge cannot leak "off" of the capacitor 33 while it is charging from the voltage divider 35. The PNPN diode 36 is "off"; thus, an unusually slow rising charging characteristic of capacitor 33 can have no effect at the output terminal 47. Since it is isolated on both sides, the capacitor 33 may have an extremely slow charging time.

Means are provided for releasing an output pulse through output terminal 47 at the end of the measured time period. More particularly, the characteristics of a PNPN diode 36 are such that it switches "on" when a breakdown voltage is applied across its terminals. In greater detail, the voltage at the right-hand terminal of diode 36 is about (—)20 volts, as established by the voltage divider 43, 44. When the charge on the upper plate of capacitor 33 reaches (+)12 volts, a total of 32 volts are applied across the diode 36, and it breaks down. On breakdown, the capacitor discharges with an initial surge of current through the diode 36 and the capacitor 40 to the (—)12 v. source 48. For a period of time, a holding current flows from capacitor 33 through diode 36, and resistor 42 to drive the transistor 45 into a saturated "on" condition. When this occurs, the (—)12 volts of source 48 appears at the terminal 47 as an output pulse.

As the capacitor 33 continues to discharge, there comes a time when the current through the PNPN diode 36 falls below its holding level. Then, the diode 36 switches "off" to terminate the current driving the transistor 45. It, in turn, switches "off" to end the output pulse at terminal 47. If transistor 45 were to be biased in another manner, it could be either normally "on" or normally "off" to provide either an "off" pulse or an "on" pulse at terminal 47, for the duration of the measured period of time, as required.

The results produced by the output signal appearing at terminal 47 are not material to the invention. Presumably, the associated logic circuitry (not shown) is commanded to perform a suitable function. That logic circuitry then indicates that is has performed the function by energizing one or more of the terminals 18 with a negative potential to reset the timer.

On the other hand, if a negative reset signal does not appear at terminal 18, the capacitor 33 charges again and the cycle repeats itself to give another output signal.

Perhaps a concrete illustration of one exemplary use of the invention will help to explain how the timer circuit may be used. According to this illustration, appearance of voice signals in an electronic switching telephone system cause negative voltages to appear at one or more of the input terminals 18. If the subscribers stop talking, the negative signals disappear, and capacitor 33 begins to charge. During any normal conversation, the subscribers will almost surely say something within three minutes to thereby cause the capacitor 33 to discharge. Hence, the timer does not time out, and no output signal is released. On the other hand, if the conversation has ended and the subscribers have failed to replace their handsets, for example, the resetting voice signals do not reappear at the terminal 18. In three minutes, the charge on capacitor 33 reaches the voltage required to make the diode 36 break down. This sends an output pulse through the terminal 47 to release the connection. Responsive thereto, the connection should release, and a negative reset potential should appear at an input terminal 18. If it does not so appear, the capacitor 33 recharges, and another output pulse is released from the terminal 47 after approximately three additional minutes.

The invention offers the advantage that the rise time of the leading edge of the output pulse is determined by the time required for the diode 36 to switch "on." Since a PNPN diode switches "on" very quickly, the leading edge of the output pulse rises steeply. Moreover, the open "switch" leakage of both of the diodes 36, 38 is very small. Thus, the charge cannot leak "off" of the capacitor 33 while it is charging. This makes the RC time constant both accurate and consistent. Still other advantages will readily occur to those skilled in the art.

While the principles of the invention have been described above in connection with specific apparatus and applications, it is to be understood that this description is made only by way of example and not as a limitation on the scope of the invention.

I claim:

1. A timer comprising an input circuit and an output circuit having an RC network therebetween, means comprising a first diode for isolating a charge built upon the capacitor of said RC network to prevent leakage into said input circuit, means comprising an electronic switching diode for preventing a discharge of said capacitor into said output circuit when said switching diode is "off," means in said input circuit responsive to either of two input signal conditions for either discharging said capacitor via said first diode or causing said capacitor to charge, and means responsive to an accumulation of a predetermined charge upon said capacitor for turning "on" said electronic switching diode and discharging said capacitor into said output circuit.

2. The timer of claim 1 in which said input circuit includes means for causing said capacitor to accumulate said charge responsive to a predetermined logic function which comprises at least one of said two input conditions.

3. The timer of claim 1 in which said input circuit includes a bistable trigger circuit, means responsive to an occurrence of one of said two input signal conditions for switching said trigger circuit to a first stable state for discharging said capacitor, and means responsive to the other of said two input signal conditions for switching said trigger circuit to a second stable state for charging said capacitor.

4. The timer of claim 1 in which the electronic switching diode is a PNPN diode.

5. A timer comprising an input circuit, a timer circuit, and an output circuit, said input circuit including means for marking the beginning of an event to be timed, means in said timer circuit including an RC circuit isolated from both said input and output circuits for measuring said event after which a pulse is to be released, means in said timer circuit responsive to a charge built upon the capacitor in said RC circuit for releasing a signal to succeeding circuits at the end of said timed event and electronic switching means in said output circuit responsive to said signal to release a pulse.

6. The timer of claim 5 in which said input circuit includes means for enabling said capacitor to accumulate said charge responsive to a predetermined logic function which comprises at least one of said two input conditions.

7. The timer of claim 5 in which the electronic switching diode is a PNPN diode.

8. The timer of claim 5 in which the input circuit includes a bistable trigger circuit, means responsive to the beginning of said event for altering charge condition on said capacitor at a rate fixed by the resistance element of said RC circuit, and means responsive to said altered charged condition for releasing said signal to said succeeding circuit.

References Cited by the Examiner

UNITED STATES PATENTS

| | | | |
|---|---|---|---|
| 2,997,601 | 8/1961 | Taylor ____________ | 307—88.5 |
| 3,106,667 | 10/1963 | Winchel ________ | 307—88.5 X |

ARTHUR GAUSS, *Primary Examiner.*

D. D. FORRER, *Assistant Examiner.*